United States Patent
Spiro et al.

(12) 
(10) Patent No.: US 6,534,903 B1
(45) Date of Patent: Mar. 18, 2003

(54) BROAD SPECTRUM REFLECTIVE COATING FOR AN ELECTRIC LAMP

(75) Inventors: Clifford Lawrence Spiro, Naperville, IL (US); Rajasingh Israel, Westlake, OH (US); Peter Brown, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,862

(22) Filed: Feb. 25, 2002

(51) Int. Cl.[7] .............. H01J 5/16; H01J 61/40
(52) U.S. Cl. .......... 313/113; 313/112; 313/635; 359/584; 359/586; 359/359
(58) Field of Search .............. 313/112, 635, 313/113; 362/293, 296, 297; 359/359, 584, 586, 588, 589, 350, 634

(56) References Cited

U.S. PATENT DOCUMENTS

| | | | |
|---|---|---|---|
| 4,229,066 A | * | 10/1980 | Rancourt et al. ........... 359/359 |
| 5,138,219 A | | 8/1992 | Krisl et al. |
| 5,143,445 A | | 9/1992 | Bateman et al. |
| 5,552,671 A | | 9/1996 | Parham et al. |
| 5,705,882 A | * | 1/1998 | Oughton ................ 313/112 |
| 5,923,471 A | * | 7/1999 | Wood et al. ............ 359/584 |
| 5,982,078 A | | 11/1999 | Krisl et al. |
| 6,331,914 B1 | * | 12/2001 | Wood et al. ............ 359/584 |
| 6,441,541 B1 | * | 8/2002 | Tschetter et al. ........ 313/113 |

* cited by examiner

*Primary Examiner*—Ashok Patel
*Assistant Examiner*—Karabi Guharay
(74) *Attorney, Agent, or Firm*—Fay, Sharpe, Fagan, Minnich & McKee, LLP

(57) ABSTRACT

An interference coating (22) for reflecting both visible light and a portion of the region of the infrared spectrum is disclosed. The coating includes a dichroic structure of a plurality of layers of a material having a low index of refraction and a plurality of layers of a material having a high index of refraction. The coating has an average spectral high reflectance of at least 80% for wavelengths in the visible light section of the electromagnetic spectrum and of at least 50% for wavelengths in a portion of the infrared section of the electromagnetic spectrum at least 150 nm wide.

20 Claims, 9 Drawing Sheets

BROAD SPECTRUM REFLECTIVE COATING FOR AN ELECTRIC LAMP

BACKGROUND OF INVENTION

Coatings for use on reflectors of electric lamp assemblies are well known in the art. Early coatings included metallic elements that were expensive, such as gold or platinum, or elements that were or susceptible to oxidation, such as silver or aluminum. These coatings reflected both visible light and infrared radiation, but had significant disadvantages. The coatings utilizing expensive elements were economically impractical for many uses, while the oxidation-susceptible coatings were short-lived due to a relatively rapid decrease in their effectiveness because of oxidation.

Dichroic coatings were developed, in part, as inexpensive and oxidation-resistant alternatives to metallic coatings. Dichroic coatings include layers of oxides of materials that typically have low absorption of radiation in the visible light and infrared portions of the electromagnetic spectrum and that are thermally and mechanically stable. Examples include oxides of titanium, silicon, tantalum, magnesium, aluminum, niobium, hafnium, cerium, zirconium, yttrium, erbium, europium, gadolinium, indium, bismuth, thorium and other suitable rare earth metals.

Dichroic coatings of the prior art either reflect radiation within the visible light portion of the electromagnetic spectrum while transmitting radiation in the infrared portion of the spectrum, or transmit visible light while reflecting infrared radiation. These coatings of the prior art have not exhibited a high level of reflectance of substantially all wavelengths in the both the visible spectrum and a portion of the infrared spectrum.

For example, dichroic coatings that transmit visible light and reflect infrared radiation have been used on the glass tube encasing a lamp filament. The coating allows light produced by the filament to pass through the glass but reflects infrared radiation and the heat associated with such radiation back to the filament. This reflection of infrared radiation and its associated heat helps to maintain the elevated operating temperature of the filament, thereby decreasing the amount of energy required by the filament to maintain a temperature of incandescence.

Dichroic coatings that reflect visible light and transmit infrared radiation are often used on lamp reflectors. A reflector having this type of dichroic coating reflects the visible light produced by the lamp, typically in one general direction so as to increase the illuminating efficiency of the lamp in that direction. However, the dichroic coating on the reflector allows infrared radiation and its associated heat to pass through the reflector. Transmittance of infrared radiation and its heat results in an increased heat load on the components of the lamp, such as seals, foils, ballasts, fixtures, and transformers, as well as components of other items near the lamp, such as polymeric housings.

The continued exposure to infrared radiation degrades many of these components as a result of the radiation alone. In addition, the increased heat load created by the infrared radiation results in greater than normal thermal degradation. Further, the increased heat load also tends to increase oxidation of surrounding components, creating a shorter life span for those components.

As a result, it is desirable to develop coatings which have the ability to reflect both visible light and a substantial portion of the infrared spectrum at a significant level, while having the advantages of low cost and oxidation resistance possessed by dichroic coatings.

SUMMARY OF INVENTION

In an exemplary embodiment of the present invention, an interference coating for reflecting both visible light and infrared radiation is provided. The coating includes a dichroic structure of a plurality of layers of a material having a low index of refraction and a plurality of layers of a material having a high index of refraction. The coating has an average spectral high reflectance of at least 80% for wavelengths in the visible light section of the electromagnetic spectrum and of at least 50% for wavelengths in a portion of the infrared section of the electromagnetic spectrum at least 150 nm wide.

In another exemplary embodiment of the present invention, an interference coating for reflecting both visible light and infrared radiation is provided. The coating includes a dichroic structure including a plurality of alternating layers of an oxide of silicon and an oxide selected from the group consisting of titanium, tantalum, niobium, hafnium and combinations thereof. The coating has an average spectral high reflectance of at least 80% for wavelengths of from about 400 nm to about 800 nm and of at least 50% for wavelengths in a portion at least 150 nm wide of the electromagnetic spectrum beyond a wavelength of about 800 nm at a normal angle of incidence.

In yet another exemplary embodiment of the present invention, an electric lamp including a reflector for reflecting both visible light and infrared radiation is provided. The reflector includes a substrate and at least a portion of the substrate is coated with a dichroic structure including a plurality of layers. The coating has an average spectral high reflectance of at least 80% for wavelengths in the visible light section of the electromagnetic spectrum and of at least 50% for wavelengths in a portion of the infrared section of the electromagnetic spectrum at least 150 nm wide.

DETAILED DESCRIPTION

Figure 1:
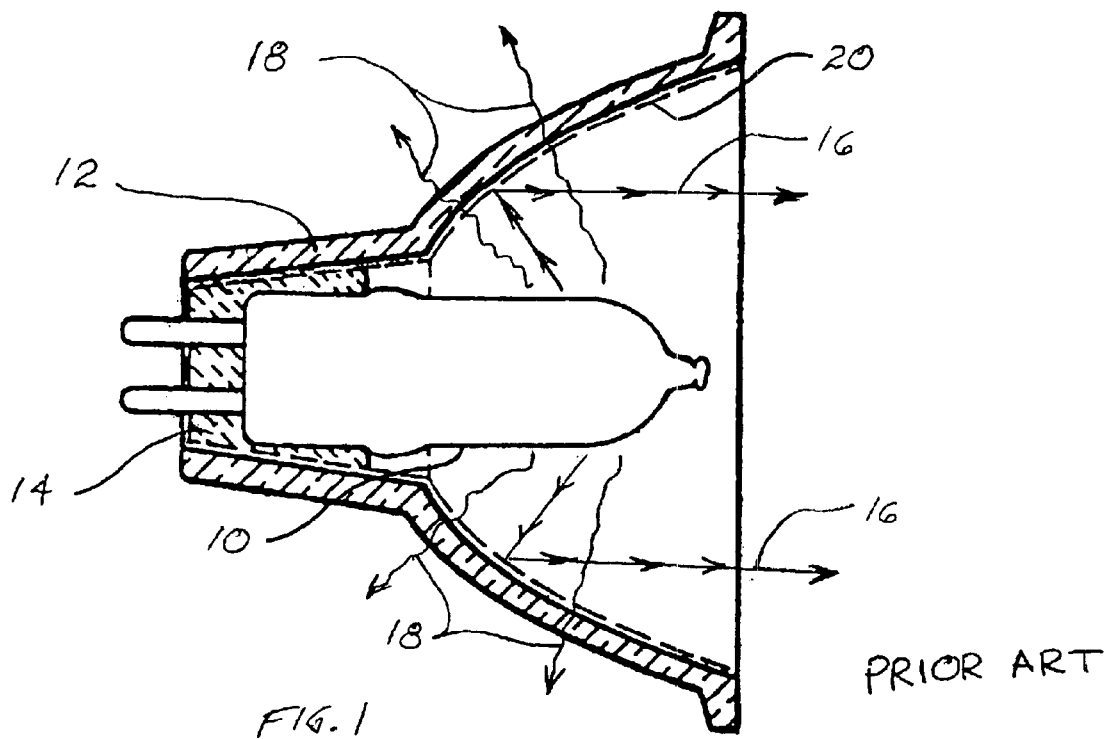
FIG. 1 is a side cross-sectional view of an exemplary reflector and lamp of the prior art.

Referring now to the drawings, wherein the showings are for purposes of illustrating the preferred embodiment of the invention and not for the purposes of limiting the same, FIG. 1 shows an exemplary reflector using a coating of the prior art. An electric lamp 10 is at least partially surrounded by a reflector 12, suitable to the type and shape of the lamp 10 used. Although the reflector 12 is shown as concave, it may take other shapes and forms known to those skilled in the art.

The reflector 12 is secured to the lamp 10 by appropriate means as commonly practiced by those skilled in the art, such as cement 14. When energized, the lamp 10 produces both visible light 16 and infrared radiation 18. The reflector 12 typically includes a substrate of glass or a polymeric material that is coated with a dichroic coating 20. In dichroic coatings of the prior art, the visible light 16 is reflected by the coating 20, while infrared radiation 18 passes through the coating 20 and the reflector 12. This transmittance by the coating 20 allows infrared radiation and its associated heat to contact the surrounding components.

Figure 2:
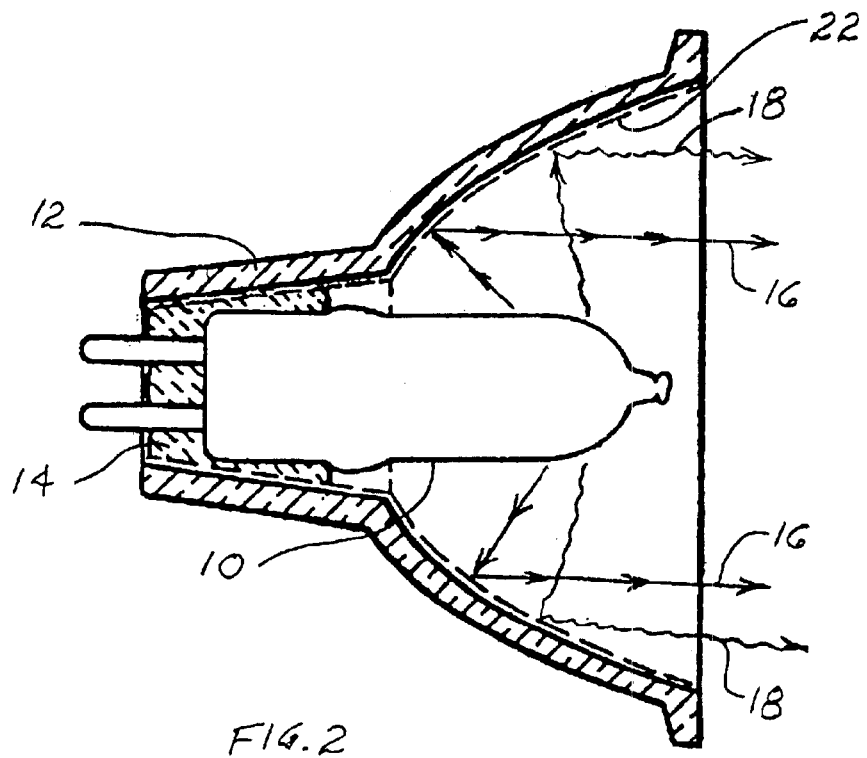
FIG. 2 is a side cross-sectional view of an exemplary reflector and lamp in accordance with the present invention.

Turning now to FIG. 2, the reflector 12 is illustrated with a dichroic coating 22 of the present invention. The visible light 16 and at least a portion of the infrared radiation 18 emitted by the lamp 10 are both substantially reflected by the coating 22. In this manner, the coating 22 reduces the amount of the infrared radiation 18 which is transmitted to surrounding components, thereby reducing the degradation caused by the radiation and its associated heat. This, in turn, increases the life of those components.

Such components may include those associated with the lamp, such as seals, foils, electronics, ballasts, fixtures and transformers (not shown), as well as items and housings that are proximate to an electric light. This is particularly important in areas where lamps with a traditionally high heat load are used, for example, in aircraft, airports, stage, studio and thermal processing operations. By reducing the infrared radiation and the resultant heat on the surrounding components, the present invention extends the life of those components. This is also true where lower heat loads may be involved, but heat sensitive components are used, such as in lamps with electronics, ballasts or other similar fixtures. Further, where limited size prevents easy dissipation of heat, as in miniature and light emitting diode (LED) applications, the present invention, by limiting the infrared radiation and the associated heat transmitted to surrounding components, extends the life of those components.

With continuing reference to FIG. 2, the plurality of layers comprising the coating 22 may be deposited by any suitable deposition technique commonly practiced by those skilled in the art. Exemplary techniques include, but are not limited to, ion plating, dip coating, laser ablation and physical vapor deposition, including thermal evaporation and sputtering. More preferably, the coating 22 may be applied by chemical vapor deposition. The coating 22 may be applied directly to the reflector 12, which may be a substrate of glass or a polymeric material, or to an intermediate layer (not shown) on the reflector 12.

Figure 3:
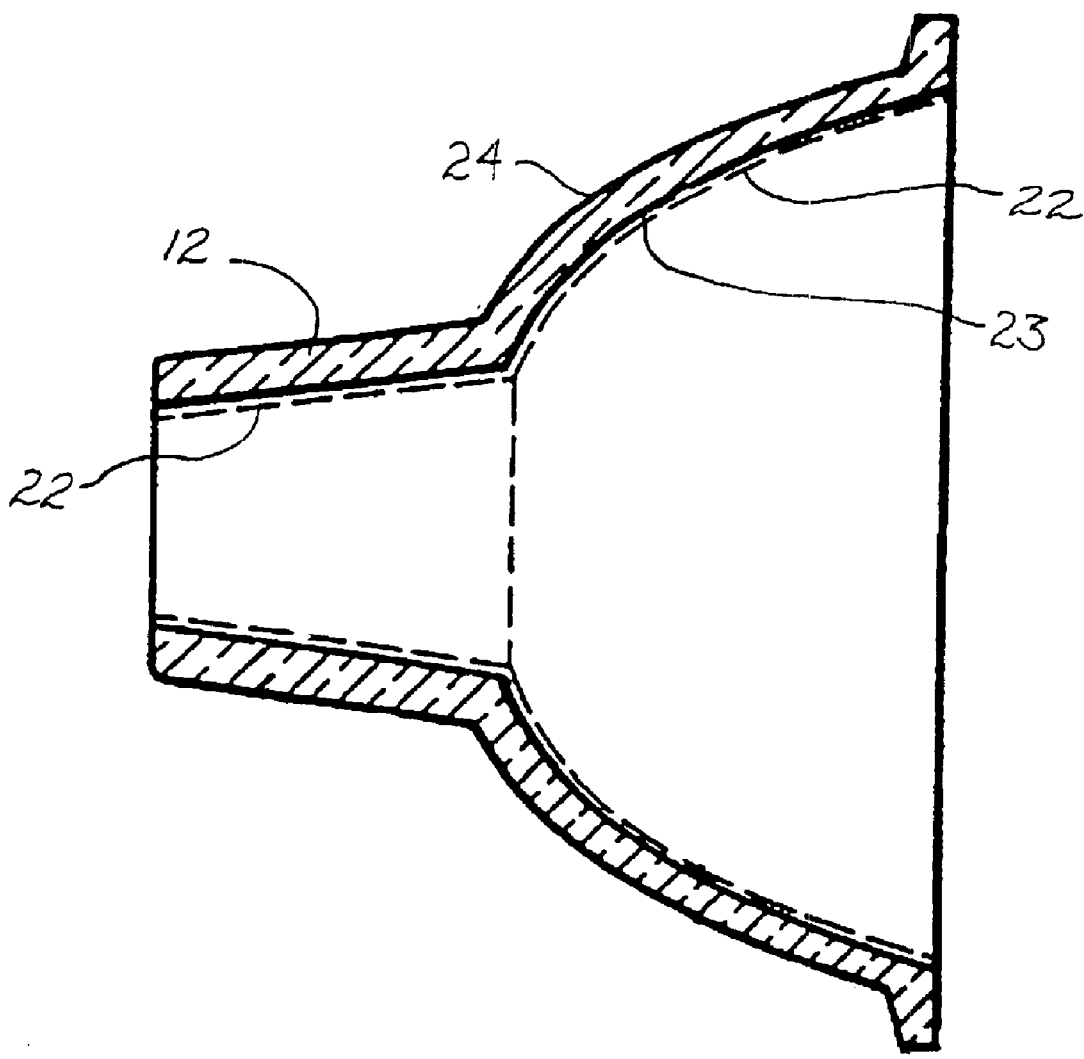
FIG. 3 is a side cross-sectional view of the reflector of FIG. 2.

As shown in FIG. 3, the dichroic coating 22 is preferably applied to the entire interior surface 23 of the reflector 12. The coating 22 may alternatively be applied to selected portions of the interior of the reflector 12. Or, it may be applied to the entire exterior surface 24 of the reflector 12, selected portions of the exterior surface 24, selected portions of both the interior 23 and exterior 24 surfaces, or the entire interior 23 and exterior 24 surface of the reflector 12.

The coating 22 is a dichroic structure comprised of a plurality of layers. The preferred layers include alternating layers of low and high refractive index materials. For example, an oxide of silicon may be the low refractive index material and an oxide of titanium or tantalum may be the high refractive index material. Other materials may be used, such as at least one of the oxides of aluminum, niobium, hafnium, cerium, zirconium, yttrium, erbium, europium, gadolinium, indium, magnesium, bismuth, thorium, as well as combinations thereof, and similarly suitable rare earth metals. The preferred choice of layer materials is based on thermal stability, mechanical stability and low absorption of radiation in the visible and infrared wavelength ranges, as well as durability and ease of deposition.

There are a large number of computer programs commercially available for performing optimization of the design of multi-layer coatings. These computer programs include: Optilayer (Optilayer, Ltd., distributed by DeBell Design); TF Calc (Software Spectra, Inc.); and McLeod Professional (published by the Thin Films Center in Phoenix, Ariz.). Characteristics such as the material or materials to be used for the layers, the desired percentage of reflectivity/transmittance at certain spectral wavelength ranges, the desired angle of incidence of the light upon the coating, and a weighting factor, which prescribes the relative importance of each of the desired characteristics, are input into the program.

The program analyzes the selected parameters, determines an arrangement of layers and checks the arrangement against the selected parameters. It then makes minor modifications to the arrangement, such as by changing the thickness of one or more layers, and determines if the new arrangement is better than the prior arrangement according to the selected parameters. The process is repeated until no further improvements can be made. Obviously, not all the parameters can be optimized fully at the same time, but those parameters that are assigned a greater weight receive a higher priority in the optimization. In this manner, the program determines the optimum number of layer s and the thickness of each layer of the coating 22 to meet the selected parameters.

Utilizing such software, the inventors have developed coatings 22 that can be manufactured in a practical manner that exhibit a high level of reflectance of wavelengths in the visible spectrum and in a portion of the spectrum of infrared radiation.

In the preferred embodiments, the program used to calculate the number of layers and the thickness of each layer of the dichroic structure of the coating 22 is optimized to reflect one hundred percent (100%) of the waves between wavelengths of 400 nanometers (nm) and 1,500 nm for some embodiments, and between wavelengths of 400 nm and 1,200 nm for other embodiments. The level of reflectance for each wavelength between 400 nm and 800 nm, the visible spectrum, is weighted equally, with lesser weight assigned to each wavelength in the portion of the infrared spectrum to be tested, i.e., between 800 nm and 1,500 nm or between 800 nm and 1,200 nm. These ranges have been developed to provide the optimal portion of the infrared spectrum that may be significantly and practically reflected while maintaining a high level of reflectance of wavelengths in the visible spectrum.

The materials to be selected for the optimization program preferably include silicon dioxide, $SiO_2$, as the low index of refraction material and titanium dioxide, $TiO_2$, or tantalum oxide, $Ta_2O_5$, as the high index of refraction material.

The angle of incidence is the angle that the light makes with the normal drawn at the point of incidence, i.e., the point at which the light falls upon the surface of the coating 22. For the optimization program, the angle of incidence is specified as zero degrees (0°), referred to as a normal angle of incidence. It should be appreciated that an optimum angle of incidence for actual performance is sometimes considered to be thirty degrees (30°), but 0° is often more practical for the test environment. It should be further appreciated that the resulting level of reflectance and the accompanying range of wavelengths at which that level is observed may shift according to the angle of incidence that is used. While similar advantages will be observed at angles of incidence of 0° and 30°, the magnitude of reflectance and related wavelengths may shift accordingly. The data provided herein are based upon a normal angle of incidence. However, levels of reflectance and wavelength ranges for other angles of incidence that correspond to this data will be illustrated and are anticipated by the present invention.

As mentioned above, the thicknesses of the layers are selected to optimize a level of reflection of substantially all wavelengths in the visible spectrum and substantially all wavelengths in a portion of the spectrum of infrared radiation. This optimization preferably results in dichroic structures having between two (2) and one hundred (100) layers, and more preferably between twenty (20) and sixty (60) layers.

The thickness of each layer and of the entire coating may be expressed in terms of physical thickness with units of Angstroms (Å) or in terms of optical thickness with units of quarter waves. Reference here in will be made to physical thickness. The physical thickness of the preferred low index refractive layers may range from about 20 Å to about 10,000 Å, preferably from about 40 Å to about 5,000 Å, while that of the high refractive index layers may range from about 20 Å to about 10,000 Å, preferably from about 50 Å0 to about 3,000 Å. The thickness of the entire coating may be from about 10,000 Å to about 100,000 Å, preferably from about 20,000 Å to about 60,000 Å.

These ranges are a function of the reflective characteristics of the individual coating materials and will therefore change with a particular coating configuration. Any number of layers may be used, although at least several pairs of layers are used to achieve significant reflectivity in the visible spectrum and at least a portion of the infrared spectrum. Manufacturing considerations and cost may limit the number of layers and overall thickness of the coating 22.

Visible light consists of the portion of the electromagnetic spectrum having wavelengths from about 400 nm to about 700–800 nm. Reference herein will be made to the visible light portion of the spectrum ending at a wavelength of about 800 nm. Infrared radiation is the portion of the spectrum having wavelengths extending from the end of the visible spectrum, i.e., about 800 nm, to about 100,000 nm. Preferably the coating 22 is used to reflect a significant percentage of substantially all wavelengths in the visible spectrum and a significant percentage of substantially all wavelengths in a portion of the spectrum of infrared radiation.

Typically, the level of reflectance over a given range of wavelengths varies, but is at or above a certain percentage. This percentage is referred to as a "spectral high reflectance" for that range. It is possible that the level of reflectance at a few wavelengths may drop below the spectral high reflectance, but if such drops are narrow, i.e., extending for only one to three wavelengths, and are not too numerous, they will not significantly affect the overall level of spectral high reflectance. When the level of reflectance at each wavelength for a given range of wavelengths is averaged, the resulting value is termed an "average spectral high reflectance" for the range. Thus, while a few narrow drops below the spectral high level of reflectance may exist, the average spectral high reflectance of a coating may remain essentially unaffected by such drops.

It is not economically feasible to provide a coating that reflects one hundred percent (100%) of the waves at each wavelength in the visible spectrum and in a portion of the infrared spectrum. Therefore, a spectral high reflectance as close to 100% as possible, in consideration of manufacturing and economic factors, is preferred.

Dichroic coatings of the prior art may achieve a spectral high reflectance of close to or over 90% for wavelengths in the visible spectrum. However, the level of spectral high reflectance for these coatings past the end of the visible spectrum plummets, falling from over 90% at 800 nm to about 60% at about 900 nm, to under 20% for wavelengths extending from just under 1,000 nm to 1,600 nm in the infrared spectrum.

The arrangement of layers of the coating 22 preferably has a spectral high level of reflectance of at least 80% for substantially all of the wavelengths in the visible light section of the spectrum at a normal angle of incidence. By substantially, it is meant that the level of spectral high reflectance may drop below 80% for a few individual and isolated wavelengths, while the level of reflectance for at least 98% of the wavelengths in the 400 nm to 800 nm range is at least 80%. Such drops are considered inconsequential, as they do not significantly affect the average spectral high reflectance of the coating. For at least 50% of the wavelengths within the visible range, the coating 22 has a spectral high level of reflectance of at least 90%. Some embodiments of the coating 22 possess a spectral high level of reflectance of at least 90% for at least 80%, and up to substantially all, of the wavelengths in the visible range.

In a portion of the infrared spectrum of from about 800 nm to about 1,200 nm, one embodiment of the coating 22 includes a spectral high reflectance of at least 80% at a normal angle of incidence. Other embodiments include a spectral high reflectance of at least 50% in the portion of the infrared spectrum of from about 800 nm to about 1,500 nm. The spectral high reflectance of at least 90% of the wavelengths in this range is at least 60%. At least 30% of the wavelengths in the 800 nm to 1,500 nm range are reflected at a level of 80% and at least 10% of the wavelengths in this range are reflected at a level of at least 90% by embodiments of the coating 22. By increasing the amount of infrared radiation reflected over coatings of the prior art, the present invention reduces infrared radiation transmitted to the surrounding components of the lamp, thereby reducing the above-described detrimental effects.

To illustrate the design and the effect of the dichroic structure of the coating 22, reference is made to the following examples. It is to be understood that the present invention is not limited to the examples, and various changes and modifications may be made in the invention without departing from the spirit and scope thereof.

EXAMPLES

Example 1

Prior Art Coating

Figure 4:
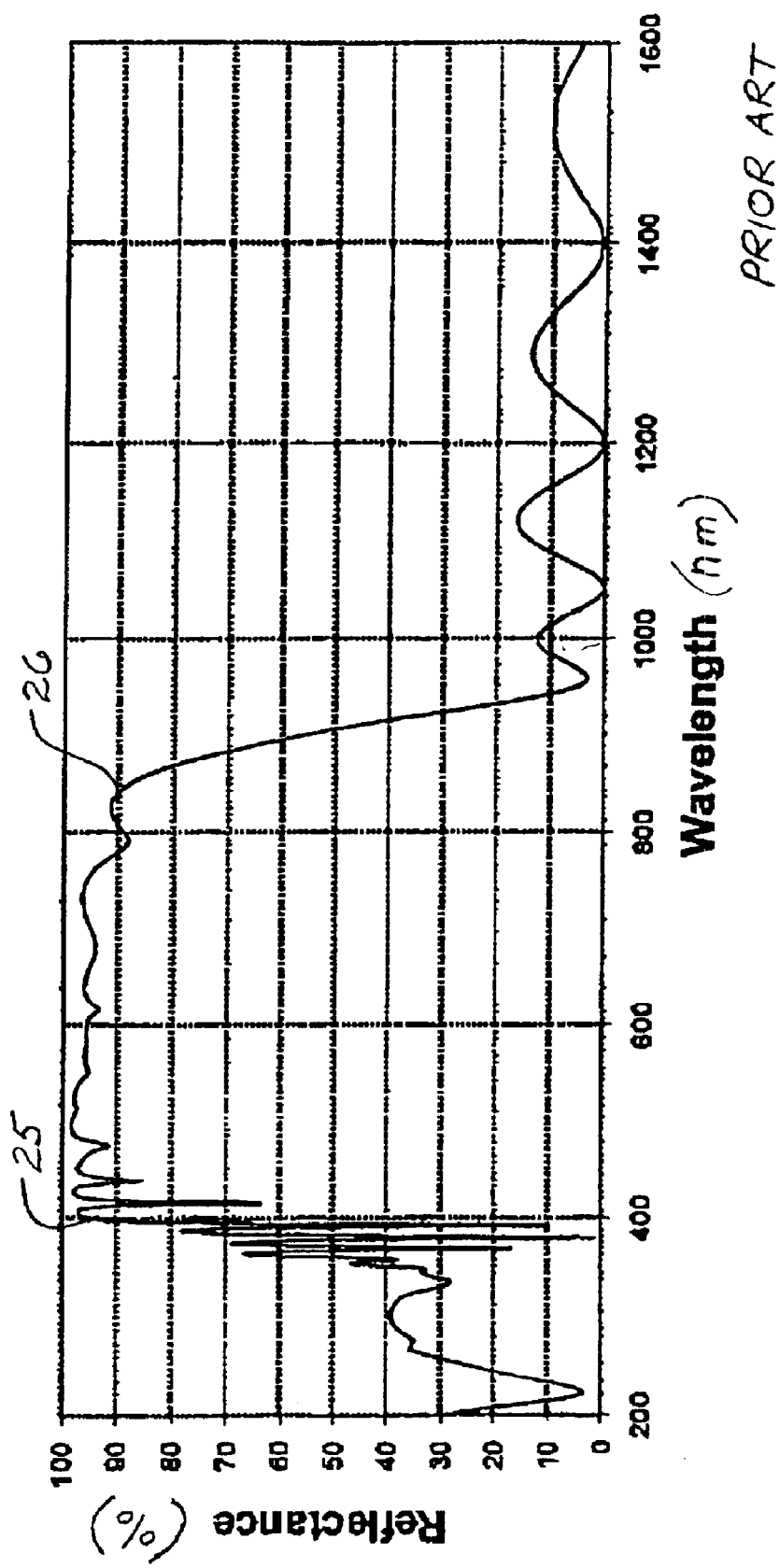
FIG. 4 is a plot showing the spectrum of wavelengths reflected versus the percentage of each wavelength reflected by coatings of the prior art.

FIG. 4 is a plot illustrating the spectrum of wavelengths reflected versus the percentage of each wavelength reflected by a typical dichroic coating of the prior art. Twenty-six (26) layers comprise the structure of the coating. The physical thickness of each layer in Angstroms (Å) is shown in Table 1 below, where L is a low refractive index material and H is a high refractive index material. Layer 1 is the layer closest to the substrate.

TABLE 1

| LAYER | MATERIAL | PHYSICAL THICKNESS (Å) |
|---|---|---|
| 1 | H | 665 |
| 2 | L | 1481 |
| 3 | H | 528 |
| 4 | L | 1683 |
| 5 | H | 526 |
| 6 | L | 1655 |
| 7 | H | 691 |
| 8 | L | 1267 |
| 9 | H | 666 |
| 10 | L | 1359 |
| 11 | H | 599 |
| 12 | L | 1130 |
| 13 | H | 561 |
| 14 | L | 1114 |
| 15 | H | 492 |
| 16 | L | 1125 |
| 17 | H | 553 |
| 18 | L | 1023 |
| 19 | H | 421 |
| 20 | L | 849 |
| 21 | H | 443 |
| 22 | L | 950 |
| 23 | H | 354 |
| 24 | L | 870 |
| 25 | H | 211 |
| 26 | L | 1722 |

For the majority of the visible portion of the spectrum, commencing with a lower end of high reflectance 25, at a wavelength of about 400 nm, and ending at a higher end of high reflectance 26, at a wavelength of just over 800 nm, a coating of the prior art exhibits a spectral high reflectance in the approximate range of 90% or higher. Thus, the spectral high reflectance of a typical prior art coating is about 90% from approximately 400 nm to just over 800 nm.

The portion of the electromagnetic spectrum that includes infrared radiation extends from a wavelength of about 800 nm to just over 100,000 nm. A dichroic coating of the prior art, as previously mentioned, either reflects visible light and transmits infrared radiation, or reflects infrared radiation and transmits visible light. The spectral high reflectance of coatings of the prior art begins to plummet at just over 800 nm 26 from a level of about 90% reflectance to about 60% reflectance at about 900 nm. For wavelengths extending from just under 1,000 nm to about 1,600 nm in the infrared spectrum the spectral high reflectance is under 20%.

Example 2

Exemplary Embodiment of the Present Invention

Figure 5:
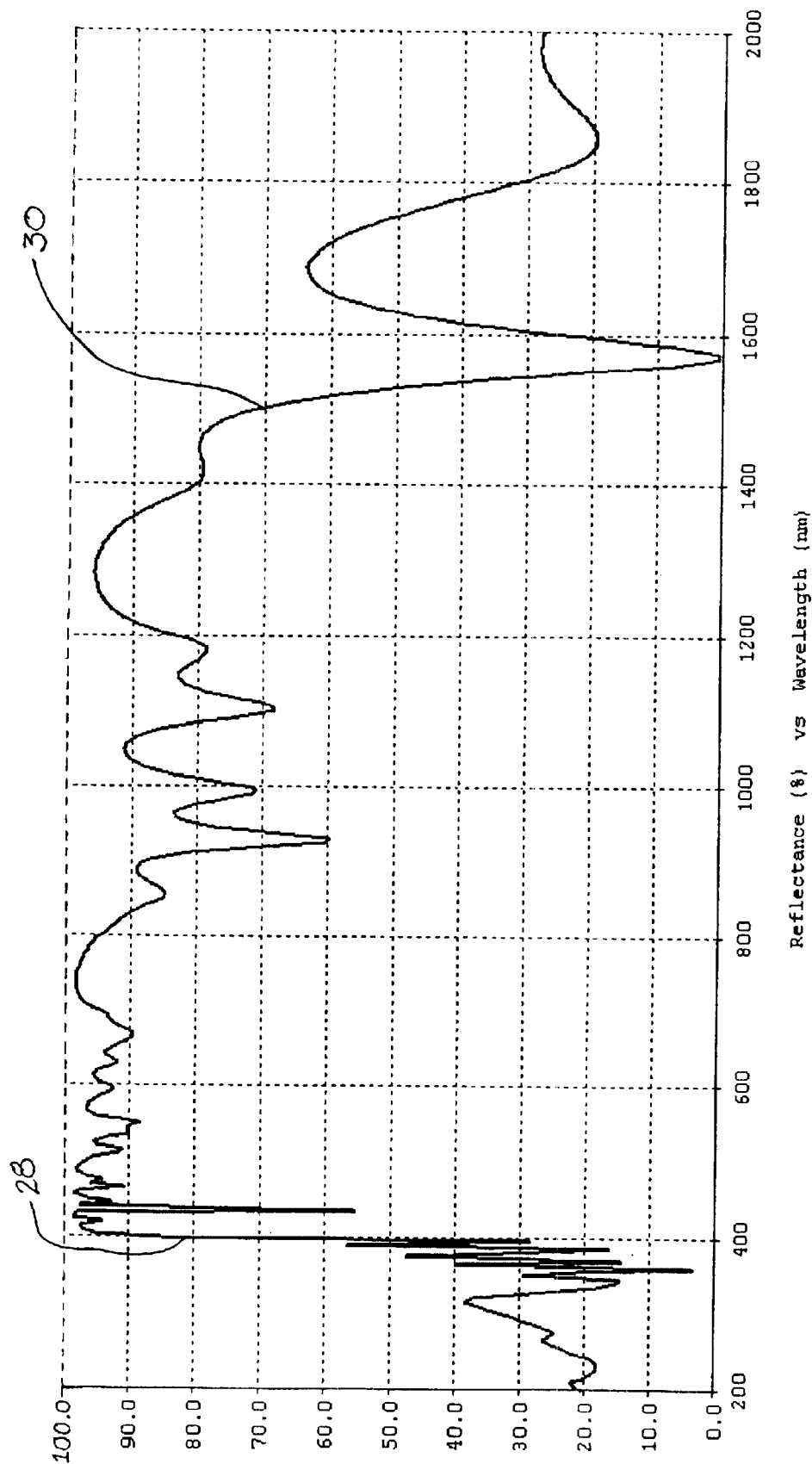
FIG. 5 is a plot showing the spectrum of wavelengths reflected versus the percentage of each wavelength reflected by an exemplary coating of the present invention at a normal angle of incidence.

FIG. 5 is a plot showing the spectrum of wavelengths reflected versus the percentage of each wavelength reflected by an exemplary embodiment at a normal angle of incidence. The materials used for this embodiment are alternating layers of titanium dioxide ($TiO_2$) and silicon dioxide ($SiO_2$). The titanium dioxide is the high refractive index material and the silicon dioxide is the low refractive index material. The coating is optimized at a target angle of incidence of 0° and includes wavelengths extending from 400 nm to 1,500 nm, with wavelengths from 400 nm to 800 nm receiving a higher weighting than those over 800 nm. The substrate material is glass.

Thirty-nine (39) alternating layers of $TiO_2$ and $SiO_2$ comprise the dichroic structure of the coating. The physical thickness in Angstroms (Å) of each layer is shown in Table 2 below. Layer 1 is the layer closest to the glass substrate.

TABLE 2

| LAYER | MATERIAL | PHYSICAL THICKNESS (Å) |
|---|---|---|
| 1 | H | 1938 |
| 2 | L | 1163 |
| 3 | H | 2183 |
| 4 | L | 1019 |
| 5 | H | 100 |
| 6 | L | 100 |
| 7 | H | 1050 |
| 8 | L | 124 |
| 9 | H | 2246 |
| 10 | L | 1166 |
| 11 | H | 1874 |
| 12 | L | 579 |
| 13 | H | 100 |
| 14 | L | 100 |
| 15 | H | 1825 |
| 16 | L | 1156 |
| 17 | H | 173 |
| 18 | L | 100 |
| 19 | H | 3000 |
| 20 | L | 914 |
| 21 | H | 1071 |
| 22 | L | 100 |
| 23 | H | 100 |
| 24 | L | 715 |
| 25 | H | 1222 |
| 26 | L | 839 |
| 27 | H | 1013 |
| 28 | L | 621 |
| 29 | H | 1412 |
| 30 | L | 578 |
| 31 | H | 1489 |
| 32 | L | 494 |
| 33 | H | 916 |
| 34 | L | 419 |
| 35 | H | 872 |
| 36 | L | 428 |
| 37 | H | 919 |
| 38 | L | 429 |
| 39 | H | 100 |

The dichroic structure of this embodiment commences a spectral high reflectance of at least 80% at a point 28 which is at a wavelength of about 400 nm. Throughout substantially all of the visible light spectrum, i.e., for at least 98% of the wavelengths in the visible spectrum, the coating has an average spectral high reflectance of at least 80%. The few individual and isolated wavelengths where the spectral high reflectance of the coating drops below 80% are considered inconsequential, as they do not significantly affect the average spectral high reflectance of the coating. In particular, the average spectral high reflectance is at least 80% between wavelengths from about 400 nm to about 800 nm. In addition, for at least 80% of the wavelengths between about 400 nm and about 800 nm, the coating has a spectral high reflectance of at least 90%.

This embodiment continues to possess a spectral high reflectance of at least 60% from the end of the visible light spectrum (800 nm) into a portion of the infrared spectrum over 150 nm wide. The termination of such spectral high reflectance is at a wavelength of about 1,500 nm 30. Thus, from a wavelength of about 400 nm, in the visible light spectrum, to a wavelength of about 1,500 nm, in the infrared spectrum, the layered structure of this embodiment has an average spectral high reflectance of at least 60% at a normal angle of incidence. For at least 50% of the wavelengths between about 800 nm and about 1,500 nm a spectral high reflectance of at least 80% is achieved. Moreover, the coating has a spectral high reflectance of at least 90% for at least 10% of the wavelengths in the 800 nm to 1,500 nm range.

Figure 6:
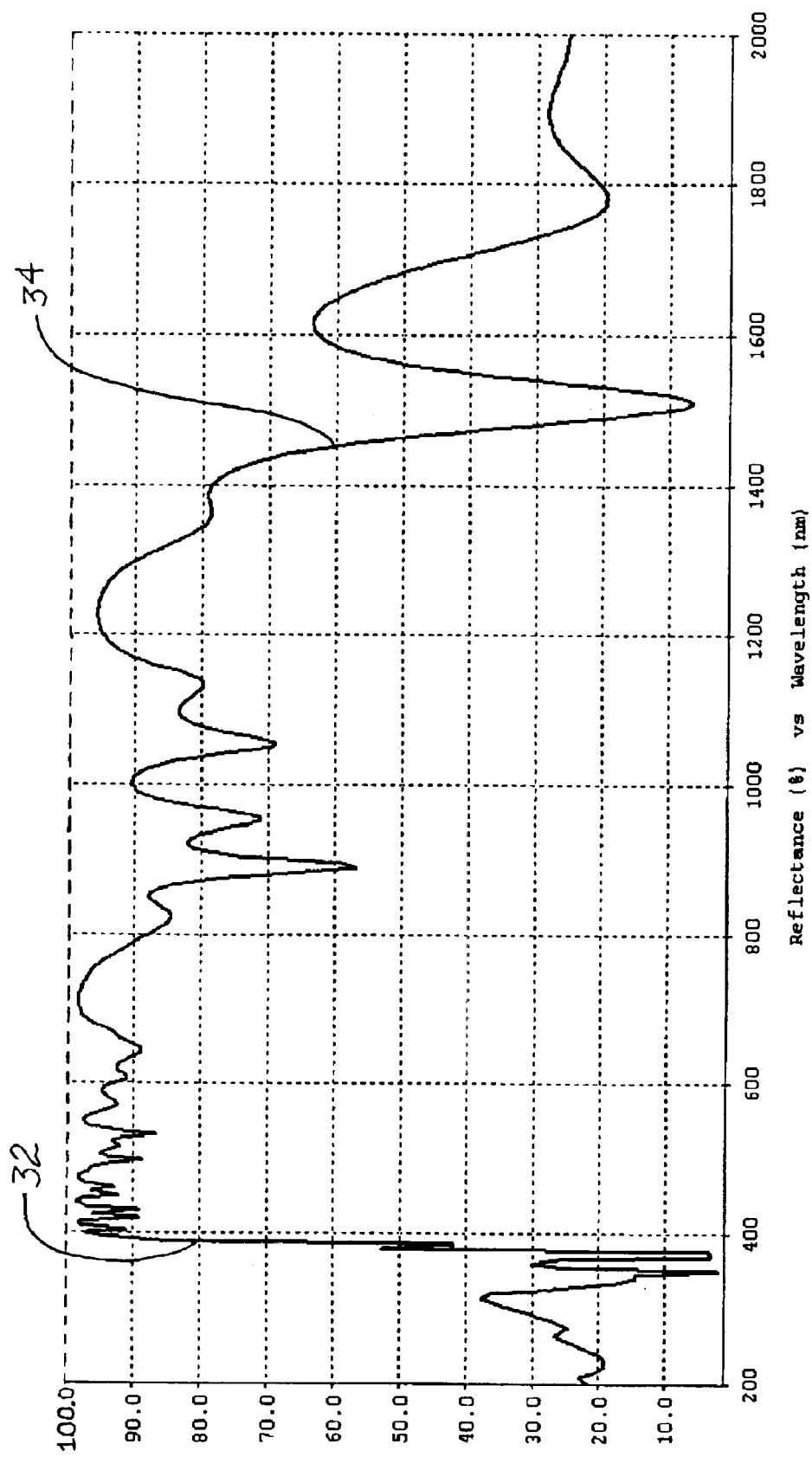
FIG. 6 is a plot showing the spectrum of wavelengths reflected versus the percentage of each wavelength reflected by the coating of FIG. 5 at a thirty (30) degree angle of incidence.

With reference to FIG. 6, a plot illustrating the shift of the wavelengths reflected at a thirty (30) degree angle of incidence is shown. The shape of the plot is substantially similar to the plot of FIG. 5. However, the thirty (30) degree angle of incidence shifts the entire plot to slightly lower wavelengths than those of FIG. 5. For example, at the thirty (30) degree angle of incidence, a spectral high reflectance of at least 80% commences at a point 32 that is at a wavelength just below about 400 nm, compared to a wavelength of about 400 nm at the normal angle of incidence. The termination of the spectral high reflectance at the thirty (30) degree angle of incidence is at a point 34 that is at a wavelength of about 1,400 nm, as compared to a wavelength of about 1,500 nm for the normal angle of incidence.

In addition, the spectral high reflectance shifts slightly downward when comparing the normal angle of incidence of FIG. 5 to the thirty (30) degree angle of incidence of FIG. 6. Also, some isolated drops in reflectance seen in FIG. 5 at the normal angle of incidence are narrowed or eliminated at the thirty (30) degree angle of incidence of FIG. 6.

Example 3

A Second Exemplary Embodiment of the Present Invention

Figure 7:
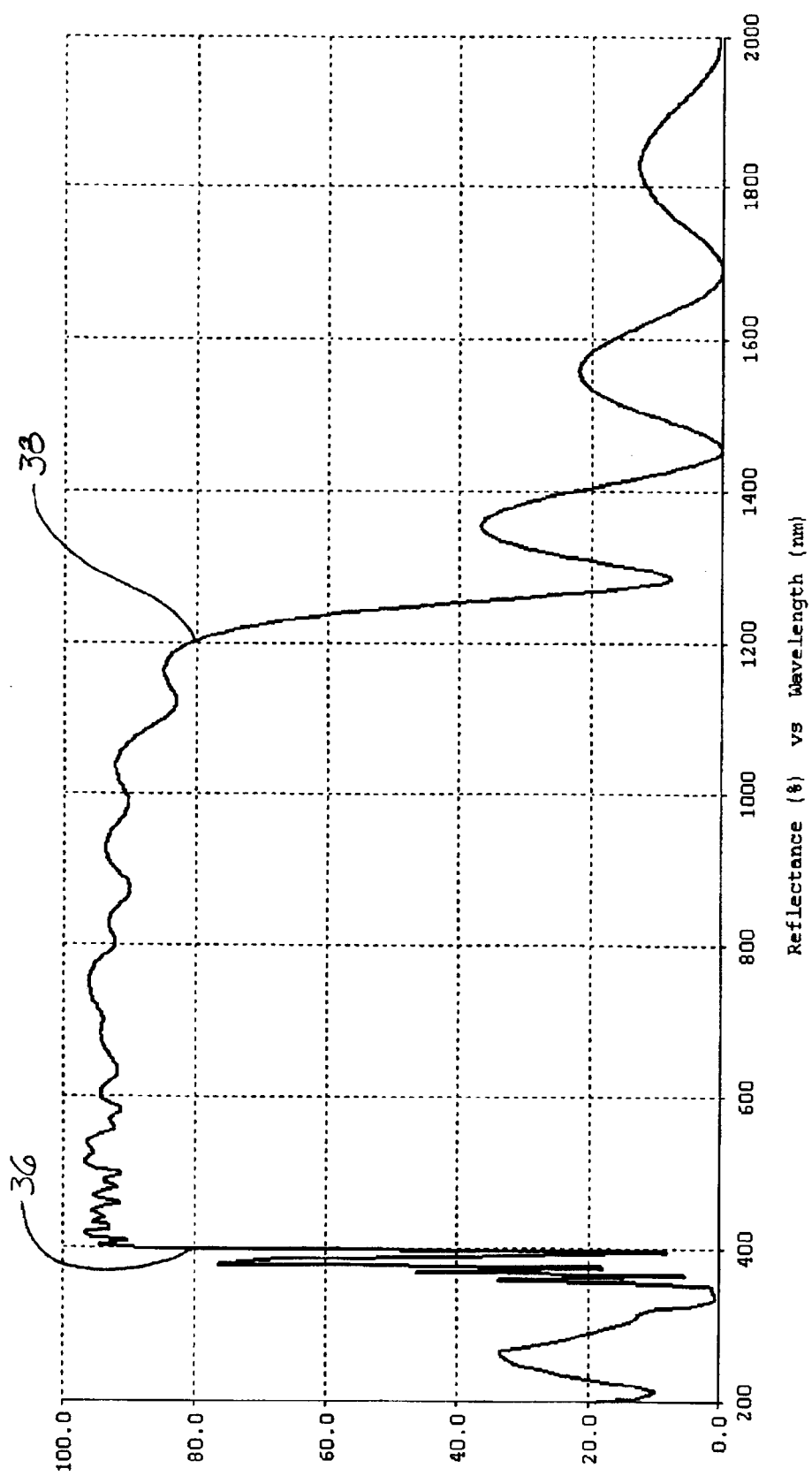
FIG. 7 is a plot showing the spectrum of wavelengths reflected versus the percentage of each wavelength reflected by another exemplary coating of the present invention at a normal angle of incidence.

FIG. 7 is a plot showing the spectrum of wavelengths reflected versus the percentage of each wavelength reflected by another exemplary embodiment at a normal angle of incidence. The materials used for this embodiment are alternating layers of titanium dioxide ($TiO_2$) and silicon dioxide ($SiO_2$). The titanium dioxide is the high refractive index material and the silicon dioxide is the low refractive index material. The coating is optimized at a target angle of incidence of 0° and includes wavelengths extending from 400 nm to 1,200 nm, with wavelengths from 400 nm to 800 nm receiving a higher weighting than those over 800 nm. The substrate material is glass.

Twenty-six (26) alternating layers of $TiO_2$ and $SiO_2$ comprise the dichroic structure of the coating. The physical thickness of each layer in Angstroms (Å) is shown in Table 3 below. Layer 1 is the layer closest to the glass substrate.

[t4]

TABLE 3

| LAYER | MATERIAL | PHYSICAL THICKNESS (Å) |
|---|---|---|
| 1 | H | 1035 |
| 2 | L | 1809 |
| 3 | H | 1041 |
| 4 | L | 1790 |
| 5 | H | 993 |
| 6 | L | 1745 |
| 7 | H | 989 |
| 8 | L | 1588 |
| 9 | H | 821 |
| 10 | L | 1296 |
| 11 | H | 712 |
| 12 | L | 1150 |
| 13 | H | 777 |

TABLE 3-continued

| LAYER | MATERIAL | PHYSICAL THICKNESS (Å) |
|---|---|---|
| 14 | L | 1164 |
| 15 | H | 762 |
| 16 | L | 1057 |
| 17 | H | 537 |
| 18 | L | 1432 |
| 19 | H | 500 |
| 20 | L | 861 |
| 21 | H | 414 |
| 22 | L | 921 |
| 23 | H | 429 |
| 24 | L | 881 |
| 25 | H | 402 |
| 26 | L | 1592 |

The dichroic structure of this embodiment commences a spectral high reflectance of at least 80% at a wavelength 36 at the beginning of the visible spectrum at about 400 nm. Throughout all of the visible light spectrum, the coating exhibits a spectral high reflectance of at least 80%. This is a spectral high reflectance of at least 80% between wavelengths from about 400 nm to about 800 nm. In addition, at least 50% of the wavelengths between about 400 nm and about 800 nm are reflected at a level of at least 90%.

This embodiment continues to exhibit a spectral high reflectance of at least 80% from the end of the visible light spectrum (800 nm) into a portion of the infrared spectrum over 150 nm wide. The termination of this level of spectral high reflectance is at a wavelength of about 1,200 nm 38. Thus, from a wavelength of about 400 nm, in the visible light spectrum, to a wavelength of about 1,200 nm, in the infrared spectrum, the layered structure of this embodiment has a spectral high reflectance of at least 80% at a normal angle of incidence. In certain portions of the infrared spectrum, i.e., from about 800 nm to just over 1,000 nm, the coating possesses a spectral high reflectance at or near a level of 90%.

Figure 8:
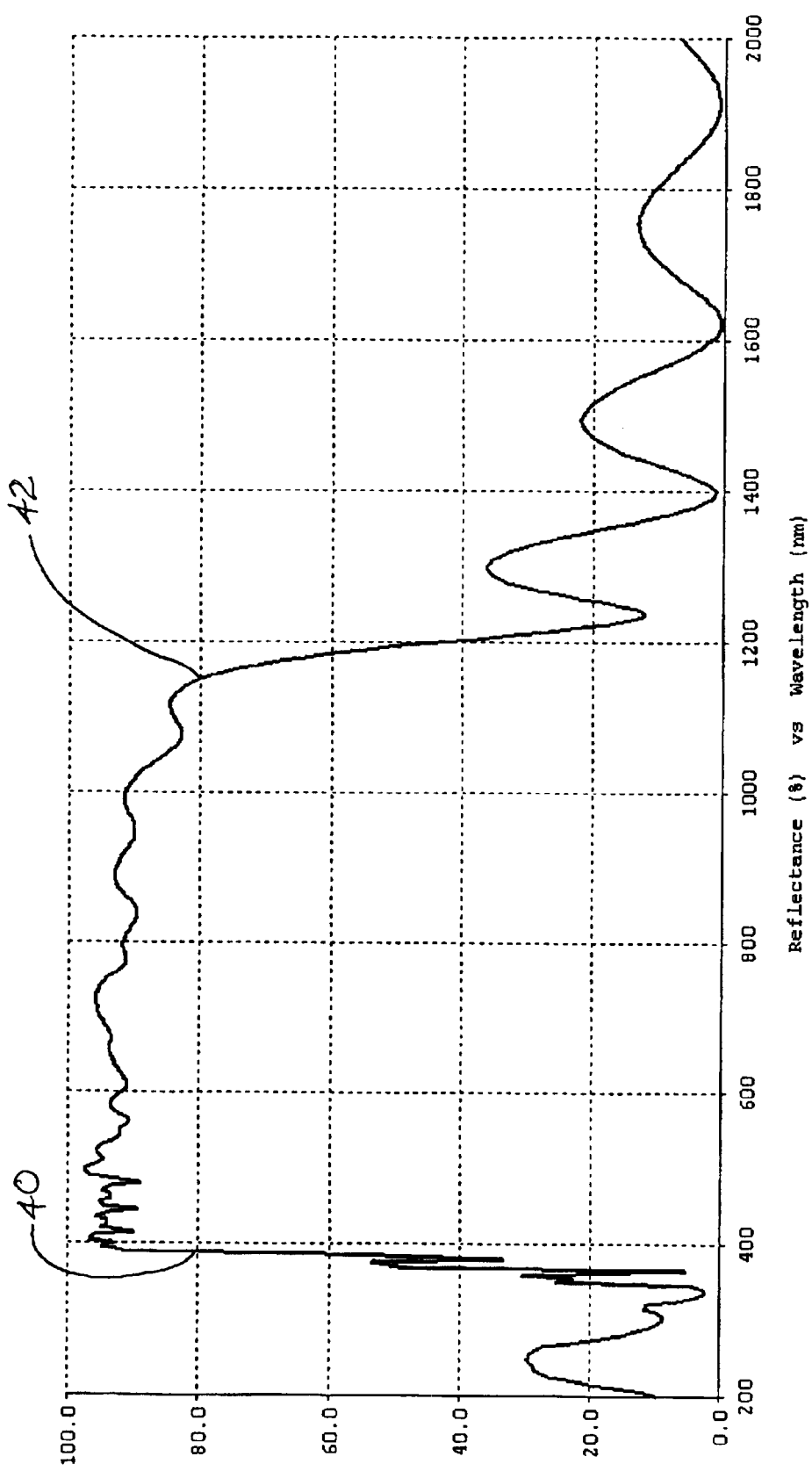
FIG. 8 is a plot showing the spectrum of wavelengths reflected versus the percentage of each wavelength reflected by the coating of FIG. 7 at a thirty (30) degree angle of incidence.

Turning to FIG. 8, a plot illustrating the shift of the wavelengths reflected at a thirty (30) degree angle of incidence is shown. The shape of the plot is substantially similar to the plot of FIG. 7. However, the thirty (30) degree angle of incidence shifts the entire plot to slightly lower wavelengths than those of FIG. 7. For example, at the thirty (30) degree angle of incidence, a spectral high reflectance of at least 80% commences at a point 40 that is at a wavelength just below about 400 nm, compared to a wavelength of about 400 nm at the normal angle of incidence. The termination of such spectral high reflectance at the thirty (30) degree angle of incidence is at a point 42 that is at a wavelength just over about 1,100 nm as compared to a wavelength of about 1,200 nm for the normal angle of incidence. In addition, the spectral high reflectance for some wavelengths shifts slightly when comparing the normal angle of incidence of FIG. 7 to the thirty (30) degree angle of incidence of FIG. 8.

Example 4

A Third Exemplary Embodiment of the Present Invention

Figure 9:
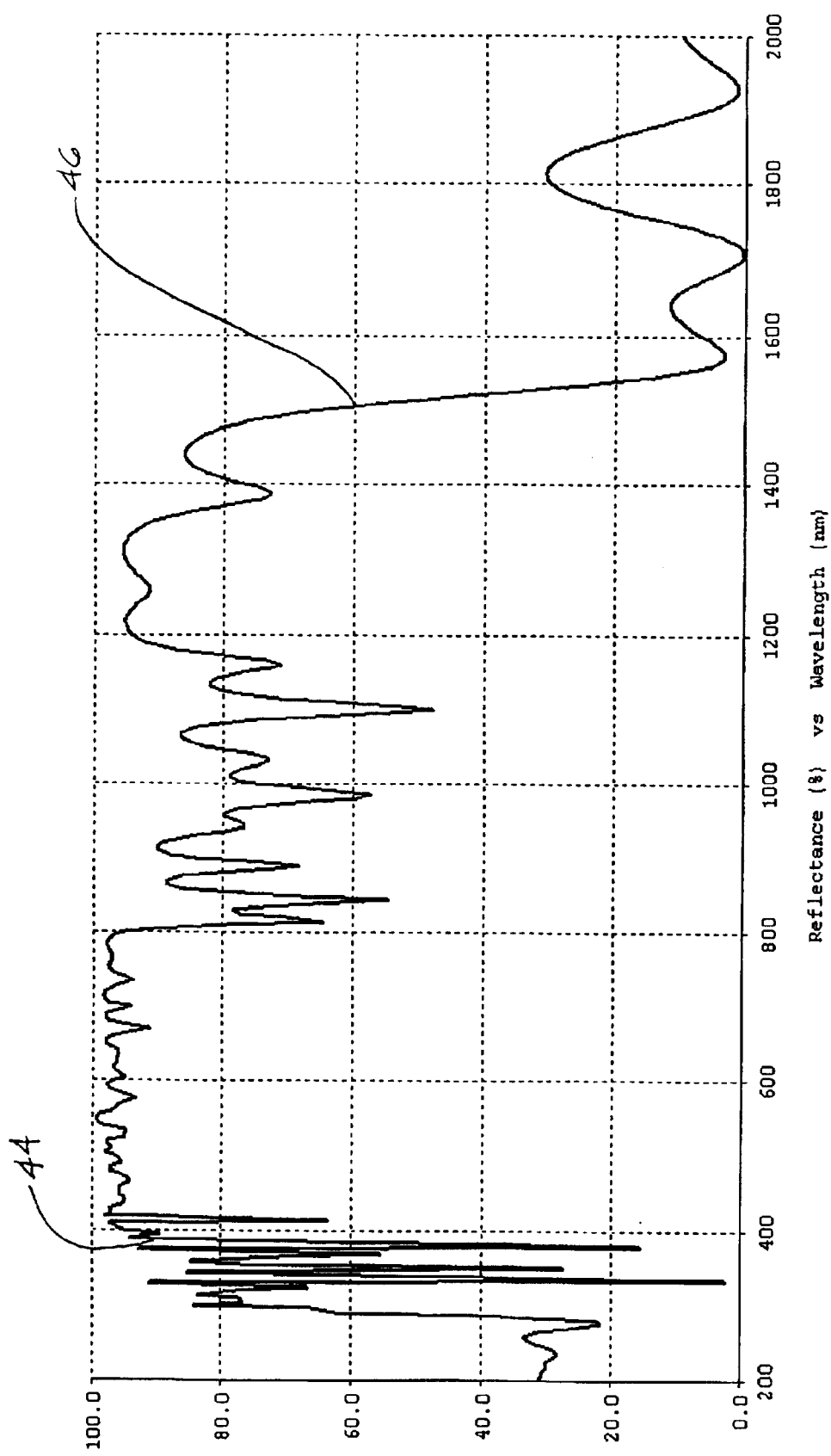
FIG. 9 is a plot showing the spectrum of wavelengths reflected versus the percentage of each wavelength reflected by yet another exemplary coating of the present invention at a normal angle of incidence.

FIG. 9 is a plot showing the spectrum of wavelengths reflected versus the percentage of each wavelength reflected by still another exemplary embodiment at a normal angle of incidence. The materials used for this embodiment are alternating layers of tantalum oxide ($Ta_2O_5$) and silicon dioxide ($SiO_2$). The tantalum oxide is the high refractive index material and the silicon dioxide is the low refractive index material. The coating is optimized at a target angle of incidence of 0° and includes wavelengths extending from 400 nm to 1,500 nm, with wavelengths from 400 nm to 800 nm receiving a higher weighting than those over 800 nm. The substrate material is glass.

Fifty-two (52) alternating layers of $Ta_2O_5$ and $SiO_2$ comprise the dichroic structure of the coating. The physical thickness of eachlayer in Angstroms (Å) is shown in Table 4 below. Layer 1 is the layer closest to the glass substrate. [t3]

TABLE 4

| LAYER | MATERIAL | PHYSICAL THICKNESS (Å) |
|---|---|---|
| 1 | H | 585 |
| 2 | L | 198 |
| 3 | H | 539 |
| 4 | L | 2168 |
| 5 | H | 1128 |
| 6 | L | 1485 |
| 7 | H | 2297 |
| 8 | L | 1924 |
| 9 | H | 1610 |
| 10 | L | 1757 |
| 11 | H | 2122 |
| 12 | L | 2066 |
| 13 | H | 1476 |
| 14 | L | 1811 |
| 15 | H | 1311 |
| 16 | L | 1653 |
| 17 | H | 921 |
| 18 | L | 1399 |
| 19 | H | 980 |
| 20 | L | 1319 |
| 21 | H | 558 |
| 22 | L | 1095 |
| 23 | H | 1075 |
| 24 | L | 1165 |
| 25 | H | 796 |
| 26 | L | 1595 |
| 27 | H | 719 |
| 28 | L | 928 |
| 29 | H | 561 |
| 30 | L | 822 |
| 31 | H | 137 |
| 32 | L | 861 |
| 33 | H | 580 |
| 34 | L | 879 |
| 35 | H | 539 |
| 36 | L | 772 |
| 37 | H | 248 |
| 38 | L | 847 |
| 39 | H | 539 |
| 40 | L | 828 |
| 41 | H | 521 |
| 42 | L | 1025 |
| 43 | H | 662 |
| 44 | L | 1129 |
| 45 | H | 546 |
| 46 | L | 955 |
| 47 | H | 549 |
| 48 | L | 983 |
| 49 | H | 553 |
| 50 | L | 1219 |
| 51 | H | 650 |
| 52 | L | 48 |

The dichroic structure of this embodiment commences an average high spectral reflectance of at least 90% at a point 44 just before the beginning of the visible spectrum at 400 nm. Throughout substantially all of the visible light spectrum, i.e., for at least 98% of the wavelengths in the visible spectrum, the coating has a spectral high reflectance of at least 90%. The few individual and isolated wavelengths where the spectral high reflectance of the coating drops below 90% are considered inconsequential, as they do not significantly affect the average high reflectance of the coating.

This embodiment continues to exhibit a spectral high reflectance of at least 50% for substantially all of the wavelengths, i.e., at least 98%, in a portion of the infrared spectrum over 150 nm wide, extending from about 800 nm to about 1,500 nm at a point 46. For at least 90% of the wavelengths in this range the spectral high reflectance is at least 60%. The few wavelengths at which the level of reflectance drops below the spectral high reflectance of 60% do not significantly affect the average spectral high reflectance of at least 60% for the range extending from about 800 nm to about 1,500 nm. In addition, the spectral high reflectance is at least 80% for at least 30% of the wavelengths in this range and is at least 90% for at least 10% of the wavelengths in this range.

Thus, from a wavelength of about 400 nm, in the visible light spectrum, to a wavelength of about 1,500 nm, in the infrared spectrum, the layered structure of the coating 22 has an average spectral high reflectance of at least 60% at a normal angle of incidence. In the visible spectrum this average spectral high reflectance increases to at least 90%.

Figure 10:
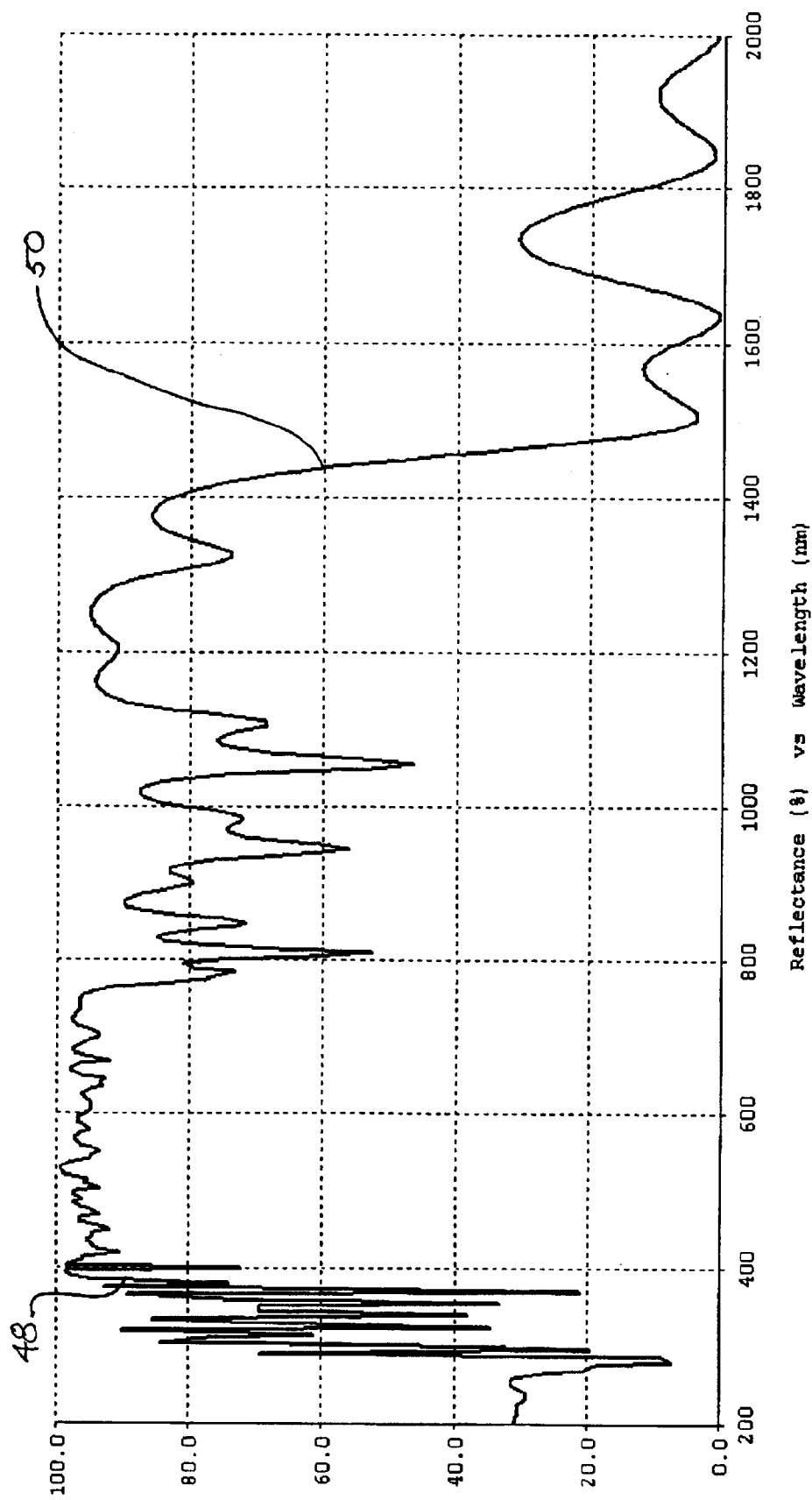
FIG. 10 is a plot showing the spectrum of wavelengths reflected versus the percentage of each wavelength reflected by the coating of FIG. 9 at a thirty (30) degree angle of incidence.

With reference to FIG. 10, a plot illustrating the shift of the wavelengths reflected at a thirty (30) degree angle of incidence is shown. The shape of the plot is substantially similar to the plot of FIG. 9. However, the thirty (30) degree angle of incidence shifts the entire plot to slightly lower wavelengths than those of FIG. 9. For example, at the thirty (30) degree angle of incidence, an average spectral high reflectance of at least 90% commences at a point 48 that is at a wavelength well below about 400 nm, compared to a wavelength just slightly below 400 nm at the normal angle of incidence. The termination of this average spectral high reflectance at the thirty (30) degree angle of incidence is at a point 50 that is at a wavelength of just over 1,400 nm, as compared to a wavelength of about 1,500 nm for the normal angle of incidence. In addition, the spectral high reflectance shifts slightly downward when comparing the normal angle of incidence of FIG. 9 to the thirty (30) degree angle of incidence of FIG. 10.

As shown by way of the above examples, a reflector having a coating of the structure of the present invention reflects both visible light and a portion of the infrared spectrum at a relatively high level. This prevents the passage through the reflector of some infrared radiation and its associated heat generated by an electric light, reducing the destructive effect on surrounding components.

The present invention may be employed in any electric lamp using a reflector or a reflective coating. Examples include incandescent lamps, halogen lamps, compact fluorescent lamps, discharge lamps and light emitting diodes. The invention has been described with reference to preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An interference coating for reflecting both visible light and infrared radiation comprising:
   a dichroic structure including a plurality of layers of a material having a low index of refraction, and a plurality of layers of a material having a high index of refraction, the coating having an average spectral high reflectance of at least 80% for wavelengths in the visible light section of the electromagnetic spectrum and of at least 50% for wavelengths in a portion of the infrared section of the electromagnetic spectrum at least 150 nm wide.

2. The interference coating of claim 1, wherein said plurality of layers of a material having a low index of refraction and said plurality of layers of a material having a high index of refraction are alternating.

3. The interference coating of claim 1, wherein said material having a low index of refraction includes an oxide of silicon.

4. The interference coating of claim 1, wherein said portion of the infrared section of the electromagnetic spectrum includes wavelengths of from about 800 nm to about 1,500 nm at a normal angle of incidence.

5. The interference coating of claim 4, wherein said average spectral high reflectance for wavelengths in said range of from about 800 nm to about 1,500 nm is at least 60%.

6. The interference coating of claim 5, wherein said material having a high index of refraction includes an oxide selected from the group consisting of titanium and tantalum.

7. The interference coating of claim 1, wherein said portion of the infrared section of the electromagnetic spectrum includes wavelengths of from about 800 nm to about 1,200 nm at a normal angle of incidence.

8. The interference coating of claim 7, wherein said average spectral high reflectance for wavelengths in said range of from about 800 nm to about 1,200 nm is at least 80%.

9. The interference coating of claim 8, wherein said material having a high index of refraction includes titanium.

10. The interference coating of claim 9, wherein said average spectral high reflectance for wavelengths in the visible light section of the electromagnetic spectrum is at least 90%.

11. An interference coating for reflecting both visible light and infrared radiation comprising:
a dichroic structure including a plurality of alternating layers of an oxide of silicon and an oxide selected from the group consisting of titanium, tantalum, niobium, hafnium and combinations thereof, the coating having an average spectral high reflectance of at least 80% for wavelengths of from about 400 nm to about 800 nm and of at least 50% for wavelengths in a portion at least 150 nm wide of the electromagnetic spectrum beyond a wavelength of about 800 nm at a normal angle of incidence.

12. The interference coating of claim 11, wherein said oxide selected from the group consisting of titanium, tantalum, niobium, hafnium and combinations thereof includes titanium and said average spectral high reflectance for wavelengths in said portion of the electromagnetic spectrum beyond about 800 is at least 60% from about 800 nm to about 1,500 nm.

13. The interference coating of claim 12, further comprising a spectral high reflectance of at least 80% for at least 50% of the wavelengths extending from about 800 nm to about 1,500 nm.

14. The interference coating of claim 11, wherein said oxide selected from the group consisting of titanium, tantalum, niobium, hafnium and combinations thereof includes titanium and said average spectral high reflectance for wavelengths in said portion of the electromagnetic spectrum beyond about 800 nm is at least 80% from about 800 nm to about 1,200 nm.

15. The interference coating of claim 14, further comprising a spectral high reflectance of at least 90% for at least 50% of the wavelengths extending from about 400 nm to about 800 nm.

16. The interference coating of claim 11, wherein said oxide selected from the group consisting of titanium, tantalum, niobium, hafnium and combinations thereof includes tantalum;
said average spectral high reflectance from about 400 nm to about 800 nm is at least 90%; and
said average spectral high reflectance for wavelengths in said portion of the electromagnetic spectrum beyond about 800 nm is at least 60% from about 800 nm to about 1,500 nm.

17. An electric lamp, comprising:
a reflector for reflecting both visible light and infrared radiation, including a substrate; and
at least a portion of said substrate coated with a dichroic structure including a plurality of layers, said coating having an average spectral high reflectance of at least 80% for wavelengths in the visible light section of the electromagnetic spectrum and of at least 50% for wavelengths in a portion of the infrared section of the electromagnetic spectrum at least 150 nm wide.

18. The electric lamp of claim 17, wherein the substrate is formed from the group consisting of glass and polymeric material.

19. The electric lamp of claim 17, wherein at least one of the layers includes an oxide selected from the group consisting of titanium, tantalum, niobium, hafnium and combinations thereof.

20. The electric lamp of claim 17, wherein at least one of the layers includes an oxide of silicon.

* * * * *